United States Patent [19]

Wenthe, Jr. et al.

[11] Patent Number: 5,488,464
[45] Date of Patent: Jan. 30, 1996

[54] CONSTANT VELOCITY TRANSPORT FOR ELECTRONIC DOCUMENT IMAGING

[75] Inventors: Stephen J. Wenthe, Jr., West Henrietta; Margaret C. Plain, Rochester; Robert F. Rubscha, Fairport, all of N.Y.

[73] Assignee: Xerox Corporation, Stamford, Conn.

[21] Appl. No.: 251,064

[22] Filed: May 31, 1994

[51] Int. Cl.$^6$ ............................ G03B 27/32; H04N 1/12; G03G 15/00
[52] U.S. Cl. ............................ 355/233; 355/23; 355/50; 358/496
[58] Field of Search ............................ 355/23, 50, 233; 358/496, 498

[56] References Cited

U.S. PATENT DOCUMENTS

| 4,536,077 | 8/1977 | Stoffel | 355/235 |
| 5,101,284 | 3/1992 | Tanabe | 358/496 X |

OTHER PUBLICATIONS

Xerox Disclosure Journal, vol. 8, No. 4 Jul./Aug. 1983 Author: Thomas Acquaviva.

*Primary Examiner*—Joan H. Pendegrass

[57] ABSTRACT

In a document handler for sequentially feeding document sheets over an imaging platen to be imaged with a constant velocity driven roller overlying the imaging platen, a document feeding control system which predicts when the constant velocity driven sheet feeding roller will be driven against the platen with no document sheet therebetween, an automatic lifting system which automatically lifts the feeding roller away from the platen in response to the document feeding control system predicting that no document sheet will be between the feeding roller and the platen and a forward roller driving signal being applied or when a reverse driving signal is being applied. The constant velocity feeding roller has at least four sections of two different diameters; an inner pair of common diameter feed roller surfaces and an outer pair of slightly smaller diameter surfaces on opposite sides providing document hold down and document edge detection image background. Additional constant velocity driven document sheet feeding nips are provided spaced upstream and downstream of the imaging platen and are commonly driven.

7 Claims, 4 Drawing Sheets

CONSTANT VELOCITY TRANSPORT FOR ELECTRONIC DOCUMENT IMAGING

Cross-reference is made to two copending and commonly assigned U.S. applications disclosing aspects of the document stack feeder/separator and document electronic imager example herein; application Ser. Nos. 08/134,775 and 08/135,097 filed Oct. 12, 1993, Attorney Docket Nos. D/93442 and D/93442Q.

Disclosed herein is an improved system for automatically feeding and imaging documents. The disclosed embodiment provides improved moving document imaging on a platen for stationary optics.

There is additionally disclosed in the embodiment a very compact document handler for feeding and imaging sets of duplex (as well as simplex) document sheets. The disclosed embodiment is particularly advantageous for reliably automatically feeding simplex and duplex document sheets to be electronically imaged from one or both sides in a digital copier, scanner, and/or facsimile machine in serial order with a very compact and low cost but reliable document feeding apparatus.

Additionally disclosed in the embodiment herein is an overall compact document handler having a desirably very short document feeding path yet which does not require any undesirable highly arcuate or sharp bends in the paper path creating potential sheet jam sites.

More specifically, there is disclosed in the specific embodiment herein a document handler for sequentially feeding document sheets over an imaging platen to be imaged at a constant velocity with a constant velocity drive motor driving a document sheet feeding roller overlying said imaging platen for feeding engagement of document sheets between said constant velocity driven document sheet feeding roller and said platen when a forward driving signal is applied to said constant velocity drive motor, said document handler providing a document sheet feeding path from a document input to said imaging platen and to a document output, the improvement comprising a document feeding control system which predicts when said constant velocity driven sheet feeding roller will be driven against said imaging platen with no document sheet therebetween; and an automatic lifting system which automatically lifts said constant velocity document sheet feeding roller away from said imaging platen in response to said document feeding control system predicting that no document sheet will be between said constant velocity driven sheet feeding roller and said platen and said forward driving signal is being applied to said constant velocity drive motor.

Further disclosed features of the exemplary embodiment herein include, in such a document handler, wherein said constant velocity document sheet feeding roller has at least four sections of two different diameters, comprising a first inner pair of common diameter feed roller surfaces, and an outer pair of slightly smaller diameter surfaces on opposite axial sides of said inner pair of feed roller surfaces which are not feeding roller surfaces; and/or wherein said outer pair of slightly smaller diameter surfaces provide document hold down and document edge detection image background; and/or wherein a reverse driving signal is applied to said constant velocity drive motor for duplex document sheets, and wherein said automatic lifting system is also actuated in response to said reverse driving signal; and/or wherein additional constant velocity driven document sheet feeding nips are provided spaced upstream and downstream of said imaging platen and are commonly driven by said same constant velocity drive motor; and/or wherein which said imaging platen is a minor end portion, in the same plane, of a full document size platen on which documents may be stationarily placed and scanned by moving an image scanner relative thereto, and wherein said image scanner is stationarily positioned at said imaging platen for imaging the document sheets fed by said document handler; and/or wherein said imaging platen provides a narrow slit scanning imaging station, and said document handler provides a constant velocity feeding system for feeding documents through said document sheet feeding path past said slit scanning imaging station at a constant velocity for imaging; and/or wherein said automatic lifting system comprises plural open jaws positioned to liftably engage reduced diameter jaw engaging areas of said constant velocity document sheet feeding roller; and/or wherein said open jaws have an outside diameter which is less than the maximum diameter of said constant velocity document sheet feeding roller so as to partially surround it without interfering with said feeding and without engaging said platen.

By way of background, single roll constant velocity transport or CVT document transports for moving documents past a slit scanning station for imaging have been known for many years in the patent literature and in copier products. It is known that a CVT (constant velocity transport or moving document) scanner can provide rapid (and more closely spaced) document exchange times at the imaging station, to help, e.g., provide document feeding for scanning at greater than 50 scanned documents per minute. Xerox Corporation has made CVT (slit scan) type document handlers for copiers with otherwise normal large stationary document moving optics platens, such the Xerox Corporation "3100 LDC" [see, e.g., U.S. Pat. No. 4,017,172 issued Apr. 12, 1977 to Thomas Lynch]; and even earlier CVT only large document or engineering drawing copiers.

There is extensive art on simplex or duplex document feeders for light-lens copiers in which the documents are fed by a constant velocity transport (CVT) past a narrow scanning slot, which is usually a separate imaging station or window, separate from the large platen used to scan stationary documents, including books. Some examples include Canon U.S. Pat. No. 4,312,587; 4,110,030; 4,247,192; 4,456,369; 4,515,458; 4,318,609; and 4,395,118. The latter two are examples of CVT document imaging systems adjacent to the platen where the platen scanning carriage can be moved to and parked at the CVT document imaging position for alternative imaging there.

Of interest, an example of a single roll CVT, with an inner vacuum roll transport 11 with a plural section larger diameter outer roll 8, is shown and described in the July/August 1983 Xerox Disclosure Journal publication Vol. 8, No. 4, p. 319, by Thomas Acquaviva.

Of particular interest is patent art on CVT duplex (both sides imaged) document handlers specifically for electronic (digital) imaging with a raster input scanner (RIS). ARIS may be either of the full width array (FWA) type, or a smaller RIS CCD array or chip with lens image reduction. Scanners may be separate units, or may be an element of a digital copier if scanning and printing are done on an integral or modular unit at the same location. Patents on duplex document handlers specifically for RIS or other scanners (otherwise known as "electronic front ends", or EFE's) particularly include Xerox Corp. U.S. Pat. No. 4,536,077 issued Aug. 20, 1985 to James C. Stoffel. Also, a Xerox Disclosure Journal (XDJ) publication dated May/June 1983 by Richard E. Smith, Vol. 8, No. 3, p. 263. [Both, however, have two separate imaging stations for the two sides of the duplex document, and the latter shows two RIS's]. Also, Xerox Corp. U.S. Pat. No. 4,673,285 issued 1987 to Shogren; and Mead Corp. Davis et al, U.S. Pat. No. 4,429,333, issued in 1984. Said Davis, et al, U.S. Pat. No. 4,429,333 also uses the same CCD array carriage (RIS) for both the duplex CVT image station as for platen scanning, in the same plane, although the two imaging areas are separated. Said U.S. Pat. No. 4,536,077 (D/82114) scans the nth side while the document is moving toward the platen and then scans the nth minus 1 side while the document moves onto the platen. Also noted is U.S. Pat. No. 4,571,636, assigned to Fuji Xerox, issued Feb. 18, 1986, filed Dec. 21, 1983, based on Japanese App. 57-222904 filed Dec. 21, 1982, entitled "Device for reading images of both surfaces of an original in one pass", by Itoh, Satoru, and Eastman Kodak U.S. Pat. No. 5,298,937 issued Mar. 29, 1994.

Also disclosed in the cited CVT references are twin-nip CVTs moving the document past a stationary RIS between CVT nips on opposite sides of the RIS. A dual speed (fast document return) dual nip CVT is disclosed in an XDJ publication dated November/December 1979 by Vaidevutis Draugelis, Vol. 4, No. 6, pp. 743–4. Furthermore, by using angled CVT nips the document can be arcuately deformed between the two nips towards the RIS to provide sheet beam strength and more positive sheet engagement against the RIS platen or slit.

A sheet buckle formed ahead of a CVT nip for the RIS is disclosed in Xerox Corp. U.S. Pat. No. 4,451,030 (D/81012) by D. Teeter, et al.

Earlier light-lens CVT duplex document copying patents cited in said Stoffel U.S. Pat. No. 4,536,077 include Xerox Corp. U.S. Pat. No. 3,980,406 issued 1976 to Lang, U.S. Pat. No. 3,998,543 issued 1976 to Wick et al and U.S. Pat. No. 4,035,073 issued 1977 to DelVecchio. Also, Agfa Gevaert U.S. Pat. No. 4,261,661 issued 1981 to Theirs. Also, Xerox U.S. Pat. No. 3,884,654 issued Oct. 29, 1974 to Joachim Gunther, which itself in Col. 1 notes even earlier duplex document copying art on a single (or shared) optical path and document reversal after first side imaging: U.S. Pat. No. 3,227,444; 2,472,931 and 2,304,273.

Xerox Corporation U.S. Pat. No. 4,459,013 issued Jul. 10, 1984 to T. J. Hamlin and C. L. George (D/76569) shows a single CVT narrow platen imaging station recirculating document handler for simplex and duplex documents. An adjacent but separate full size manual scanning platen is also disclosed.

By way of further background art on various other document feeders specifically for electronic (digital) imaging, they include Xerox Corporation U.S. Pat. Nos. 5,026,044 (D/90006); U.S. Pat. No. 4,506,301 (filed Oct. 12, 1979, re the Xerox GIS 150 product in the Library of Congress); U.S. Pat. Nos. 4,536,077; 4,380,389; 4,451,030; 4,451,030; 4,496,984; and 4,607,951. Also, U.S. Pat. No. 4,295,167 (FIG. 5 especially) or related U.S. Pat. No. 4,287,536 (D/79039); 4,496,984; 4,471,386 (D/81132); 4,471,386 (D/81132); and 4,447,830 (D/80153) (the latter three show simple straight-through document feeding rather than a folded or inverting document path). Also, Xerox Corp. U.S. Pat. No. 4,743,974 (D/86183); and 4,967,233 (D/89023).

Further by way of background, it is known that combined facsimile and/or digital scanning for copying and printing or disk storage (and even even conventional light lens alternative copying) can be provided in one single unit, which may be encompassed by the term "printer", and are known as "multifunction", "multimode" or "combo" machines. Xerox Corporation U.S. Pat. No. 3,597,071, filed Aug. 30, 1968 and issued Jul. 27, 1971, on a "Diverse-Input System" generally shows and/or suggests mutimode or mutifunction machines for document or electronic imaging and transmission, with input for printing or facsimile selectably interfaced to a (flexible modular) printer/copier, for remote or local copying. Other patents include Xerox Corporation U.S. Pat. No. 4,947,345 filed Jul. 25, 1989 and issued Aug. 7, 1990 to Paradise, et al.; IBM Corp. U.S. Pat. No. 4,623,244, issued Nov. 18, 1986 to D. R. Andrews, et al., originally filed Oct. 4, 1976 (see, e.g., Col. 55); U.S. Pat. No. 3,597,071, filed Aug. 30, 1968 and issued Jul. 27, 1971 to Jones; Fuji Xerox Co. Ltd. U.S. Pat. No. 5,038,218, issued Aug. 6, 1991 to Matsumoto; and Sharp U.S. Pat. No. 5,012,892, issued Jun. 4, 1991 to Kita, et al.

By way of general background, as scanners, printers, copiers and/or plural-mode integral such devices or systems increase in speed, and become more automatic, it is increasingly important to provide higher speed yet more reliable and more automatic handling of the document sheets being imaged and/or copied, i.e. the document input. It is desirable to reliably feed and register document sheets sequentially, which may present a variety or mixture of sizes, types, weights, thickness, materials, conditions and susceptibility to damage. "Originals" are often previous copies. Documents may have curls, wrinkles, tears, "dog-ears", cut-outs, overlays, tape, paste-ups, punched holes, staples, adhesive or slippery areas, or other irregularities. Yet, it is very desirable to provide minimal misfeeding, and minimal document jamming, wear or damage. Original document handling, particularly for delicate, valuable, thick or irregular documents, is often more difficult and critical than feeding blank or virgin copy sheets. Documents may have typing, smearable inks, freshly printed ink jet printer output, fuser oil or other materials thereon susceptible of smearing or contamination of other documents or machine components by the sheet separation and feeding process. The image materials (and/or its fusing), can change the sheet feeding characteristics.

Avoidance of sheet skewing during feeding and maintaining proper registration and timing of documents is also important. If the document is not properly fed and registered, then undesirable dark borders and/or edge shadow images may appear on the ensuing copy sheet, or information near an edge of the document may be lost, i.e., not copied onto the copy sheet. Document misregistration, especially skewing, can also adversely affect further feeding, ejection, and/or restacking of the documents.

A preferable document handling system is one that utilizes an existing or generally conventional optical imaging system, including the external transparent copying window (known as the platen or imaging station) of the copier or scanner. However, feeding paper or plastic sheets over glass surfaces is particularly difficult, especially long term.

Document handlers may be operated and controlled with known control systems and document positional sensors. It is well known and preferable to program and execute such control functions and logic with conventional software instructions for conventional microprocessors. Such software may of course vary depending on the particular function and the particular software system and the particular microprocessor or microcomputer system being utilized, but will be available to or readily programmable by those skilled in the applicable arts without undue experimentation from either verbal functional descriptions, such as those provided herein, or prior knowledge of those functions which are conventional, together with general knowledge in the software and computer arts. E.g., In re Hayes Microcomputer Products Inc. Patent Litigation (Fed. Cir. 1992). Controls may alternatively be provided utilizing various other known or suitable hard-wired logic or switching systems.

In the description herein the term "document" or "sheet" refers to a usually flimsy sheet of paper, plastic, or other such conventional individual image substrate, and not to microfilm or electronic images which are generally much easier to manipulate. The "document" is the sheet (original or previous copy) being imaged. A "simplex" document (or copy sheet) is one having its image and page number on only one side or face of the sheet, whereas a "duplex" document (or copy sheet) has "pages", and normally images, on both sides, i.e., each duplex document is considered to have two opposing sides, faces, or "pages" even though no physical page number may be present.

As to specific hardware components of the subject apparatus, or alternatives therefor, it will be appreciated that, as is normally the case, some such specific hardware components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example below, as well as the claims. Thus, the present invention will be better understood from this description, including the drawing figures (approximately to scale) wherein:

Figure 1:
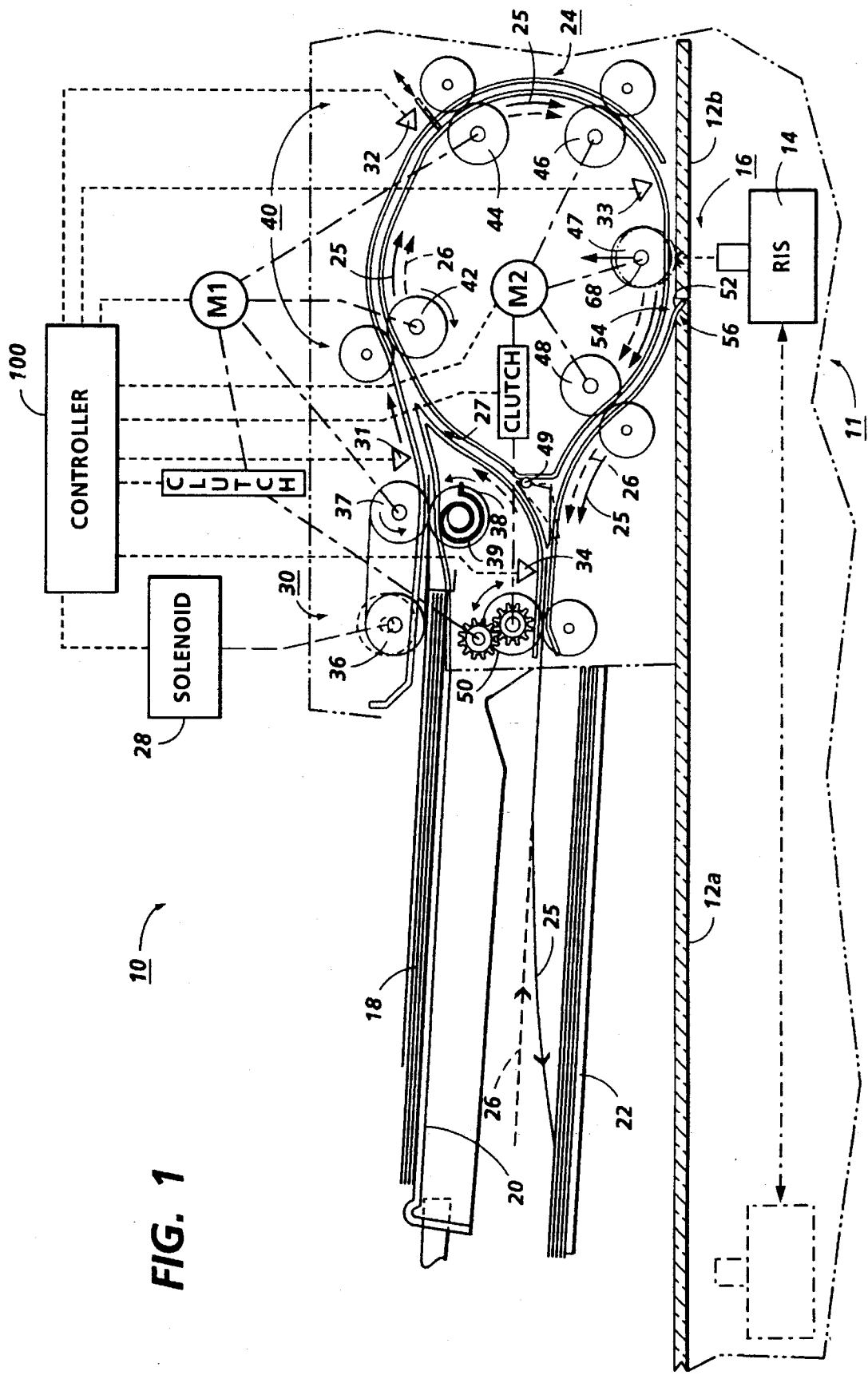
FIG. 1 is a partially schematic front view of one embodiment of an exemplary compact document handling system for electronically scanning moving documents with an exemplary CVT document feeding system.
Figure 2:
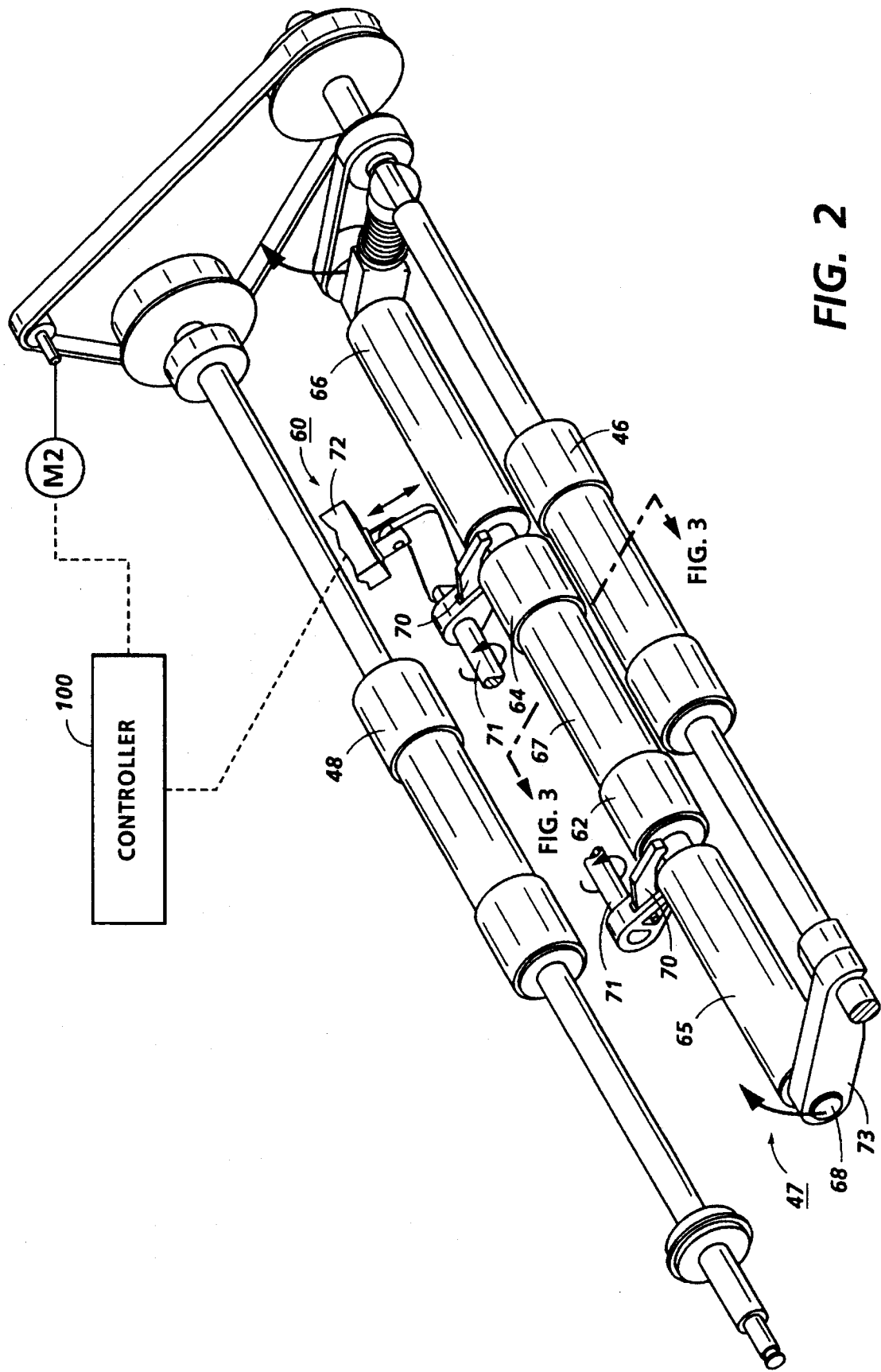
FIG. 2 is an enlarged perspective view of the CVT document feeding system of FIG. 1 and its automatic platen disengagement system.
Figure 3:
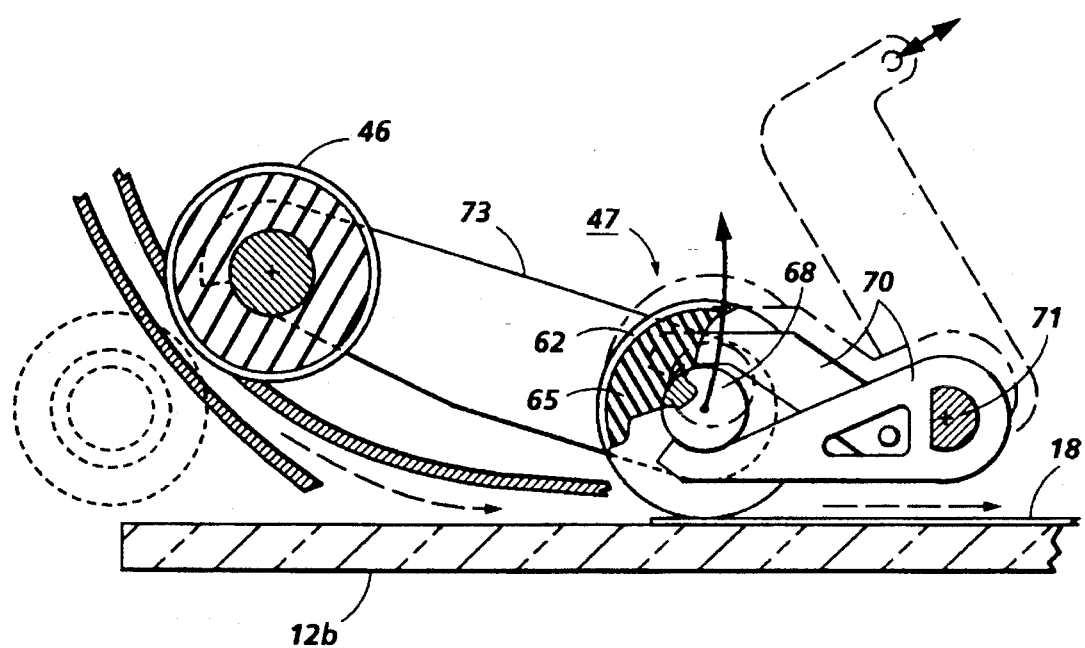
FIG. 3 is a cross-sectional view taken along line 3—3 of FIG. 2.
Figure 4:
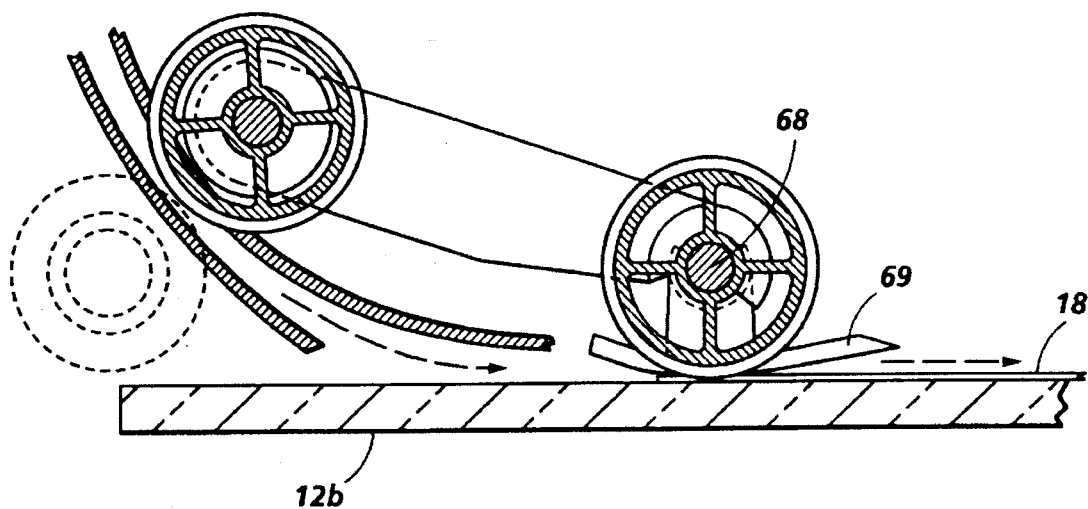

FIG. 4 shows an alternative embodiment in which the outer end roller surfaces 65, 66 of FIGS. 1–3 are functionally replaced by the illustrated alternative arcuate baffles or "wings" 69 mounted on the outer end areas of the CVT shaft, floating therewith, providing sheet input and output guidance with a central lowermost surface positioned to similarly hold the sheet within the depth of focus of the imaging system and provide an appropriate image background.

Describing now in further detail the exemplary embodiment with reference to the Figures, there is shown an exemplary document handler 10 providing the advantageous features noted above for an electronic copier and/or scanner. The exemplary document handling system 10 disclosed here includes a desirable small loop document path. It also provides "immediate" type duplex document inversion with the duplex sheet inverter chute path located over the top of the stack in the return or exit tray and under the input tray.

In the example of the Figures, there is shown a highly compact and lightweight document handler 10 which may be a part of an optional or add-on top module 11 of a convertible digital copier/scanner unit (not fully shown). The document handler 10 is desirably pivotable along a pivot axis at the rear of the module 11. That is common and typical for document handlers, so as to expose a large (document size) imaging platen for the manual placement of documents stationarily thereon. Here, a platen 12 is provided with such a large platen portion 12a, which may be scanned by a rastor input scanner or RIS 14, also part of the module 11. The entire scanner or input module 11, including the platen 12 and the RIS 14 desirably may be a removable top module so that the underlying processor or printer unit may alternatively be used as a stand alone or remote digital printer for remote electronic input. With the top module 11, including the document handler 10, mounted on the digital printer unit, the integrated unit provides a fully integrated convenience copier which even a casual operator may use simply by placing documents 18 in a document input tray 20 and automatically copying them at an imaging station 16 as if this were a normal light lens copier rather than a digital copier. Alternatively, the same document input at imaging station 16 (or platen portion 12a) provided here may also be easily used for facsimile transmissions. In that case the documents 18 will be similarly electronic imaged by RIS 14, but then transmitted over telephone lines or other communications media, with or without electronic storage or buffering. Only the relevant portions of the digital copier top module 11 and its document handler 10 need be illustrated here since the digital printer or copy processor on which it may be mounted may be any of various known, conventional, or new electronic printer units, which do not per se form part of this invention, and therefore need not be described.

The disclosed driven over-platen roller 47 CVT system provides significant motion quality improvements as compared to only dual nip CVT's only on each side of the imaging station, such as 46 and 48. Document motion quality during imaging is especially important for original document sheet feeders for high resolution electronic scanners (digital input). The disclosed system provides good sheet motion quality, and also accurately maintains the document being fed within the depth of focus of the imaging system, and yet also provides for document edge detection.

In the disclosed CVT system, (see especially FIG. 2), all three document feeding rollers, 46, 47 and 48 may be commonly driven by the same motor, such as servo motor M2, at the same speed, while the document is being imaged.

Here, the central roller 47 is a driven platen roller directly overlying, feeding and controlling the document sheet in the imaging station throughout document imaging. Yet, as will be described, it does not have many of the problems and disadvantages of prior CVT rollers driven directly against an imaging platen surface.

Disclosed herein is a CVT disengaging system 60 for automatically lifting up this driven platen CVT roll 47 when it is not feeding a document thereunder for imaging. This automatic platen roller 47 lifting system 60 has several advantages. It reduces wear on the CVT roll 47 elastomeric feeding surfaces as well as the underlying platen glass surface 12(b). The long term or life maintenance of a constant diameter of the CVT roll 47 elastomeric feeding surfaces is important. A reduction in the CVT roll 47 diameter from long term wear can decrease its sheet feeding peripheral velocity, which can undesirably change the magnification (increase the image size of) the document on the resultant copy sheets. That is particularly noticeable on duplex copies, where a top to bottom image size increase and registration from the top of the page can cause the page numbers at the bottom of the pages to not coincide. Also, to enable a simple common drive M2, the rolls 46, 47 and 48 need to be maintained at essentially constant diameters.

Further in that regard, the pre and post platen document feeding surfaces 46, 48 may, if desired, be metallic drive rollers, grit blasted, for increased long term drive radius stability and velocity control as compared to conventional elastomer surfaces.

Another advantage of automatically lifting the document CVT roll 47 whenever it is not imaging a document is to allow the same, single, but dual-mode, motor M2 to be used without clutches and yet reverse driven, if desired. Thereby motor M2 can also be used here for driving the exit roll 50 document reversal for duplex document inversion, as described elsewhere herein, if desired. If the CVT roll 47 feeding surfaces remained engaged with the platen 12 while they are being reverse driven in that mode, i.e., rotated backwards, that could cause vibration or bearing problems as well as increased wear. (However, as will be described herein, roll 47 need not be reverse driven).

The CVT roller 47 here in FIGS. 2 and 3 has four separate cylindrical sections or surfaces, 62, 64, 65 and 66, and another, 67, between 62 and 64. Surfaces 62 and 64 are the sheet feeding surfaces. All these roller surfaces are concentric on a common shaft 68 to provide the single drive-on-glass CVT roll 47. The approximate relative diameters of the two elastomeric frictional feeding surfaces 62, 64 in this example are about 22 mm, versus about 21 mm for the other CVT roll 47 surfaces 65, 66 and 67. Those other, only slightly smaller diameter surfaces 65, 66 and 67 do not provide any significant sheet feeding force, but importantly provide document holddown or flattening of the entire document sheet to within the depth of field of the imaging system 14. They can also provide imaging background surfaces.

The two elastomer feeding roll surfaces 62, 64 are spaced axially along shaft 68 so as to both be within the width of the narrowest document sheet to be fed, e.g., less than 20 cm apart, yet spaced far enough apart to ensure two distinctly spaced contact areas with every document. This spacing ensures an adequate degree of skew control as the document sheet is driven across the platen glass 12b in spite of whatever flatness or straightness tolerances are encountered in the platen glass 12b or the roll 47 shaft 68.

The two additional roll surface areas 65, 66 on the same shaft 68 extend from beyond the ends of the drive rolls 62, 64, and extend out past the edges of the widest document to be fed, e.g., at least 28 cm from end to end in this particular example. These roller 65, 66 diameters (and also the surface 67 diameter) are, as noted, marginally smaller than the drive rolls 62, 64 diameter, for the purpose of providing the sheet hold-down and optically black or other suitable imaging background.

As shown in FIGS. 2 and 3, the entire roller set 47 may be lightly gravity loaded against the platen surface 12(b) except when roller lift system 60 is activated to lift it, or vice versa. Various lifting systems may be employed. The illustrated exemplary system 60 comprises two spaced open jaws 70 engaging shaft 68 when their mounting shaft 71 is pivoted by a solenoid 72 activated by controller 100. Here, the lift system activation is when controller 100 is activated by sheet path sensors 33, etc., telling that no document is under roller 47, and power is being applied to motor M2; or, by controller 100 having a reverse drive signal to motor M2. Under those detected conditions, the jaws 70 lift the entire roller 47 up about pivot arms 73, to prevent deleterious engagement of roller 47 with platen 12a when roller 47 is being driven and no document sheet is thereunder, and also when roller 47 is reversed, even if a sheet is thereunder. The frictional surfaces 62, 64 thus do not ever directly engage platen 12b while they are forward driven, and do not ever even forcibly engage 12b or a document when reversed. Note that the bottoms of the jaws 70 (their outside diameters) are within the maximum roller 47 diameter and thus do not interfere with roller 47 or platen 12a. As shown in FIG. 3 especially, jaws 70 loosely fit partially around shaft 68, enclosed within grooves in roller 47.

Further as to the imaging station 16 CVT roller 47, as noted, this roller 47, even when engaged, desirably does not need to nip with the upper surface of the platen in most of the imaging area, as long as the entire document area being scanned is held within the depth of field or focus of the imager (RIS) 14, e.g., within less than approximately one-half mm. Sheet driving nip forces need be provided only in the two spaced minor feeding areas 62, 64. Even nip forces and even spacing is desirably maintained by a flexible or floating mounting for the roller 47, here on two independently pivotable arms 73.

At least that portion of the imaging station roller 47 surfaces 65, 66 within which the lead edge and side edges of various documents are to be detected may be a smooth polished metal or plastic surface. That provides for an optically black or other increased contrast with the document edge passing between surfaces 65 or 66 and the RIS 14, and thus improved detection of the document edges as they pass under these roller 47 surfaces.

Since the roller 47 must provide non-slip and non-skew document feeding, the roller 47 is desirably provided with the slightly larger diameter frictional drive surfaces 62, 64 generally centrally thereof. These may even be provided by thin elastomer bands around the roller 47, if desired. These bands can provide such frictional document feeding, but will not interfere with document edge detection (especially in a center-registered document feeding system) if they are not located in the document image edge areas under the roller. Here they are not. The slightly different diameter surfaces 65, 66 (optimized for light reflection or absorption rather than frictional feeding) are in the document edge detection areas here.

By way of other exemplary compatable features, as may be seen, substantially the entire document handler 10 overlies the platen 12, so as to not require any additional office space or "footprint" lateral dimensions. A further feature disclosed herein is that the same RIS 14 may be utilized for scanning documents manually placed on the platen portion 12a as well as documents which are automatically fed to be imaged on platen portion 12b by the document handler 10. This is provided here by a two part platen 12 comprising a full size scanning platen portion 12a and a narrow slit scanning portion 12b. As may be seen, these two platen portions 12a and 12b are preferably closely adjacent one another and in the same plane and utilize the same frame mounting and/or alignment system. The two document trays 20, 22 may thus also primarily overlay the platen portion 12a rather than extend the machine footprint. While the two portions 12a and 12b of the platen could be monolithic or-integral, they are preferably in two parts for advantageous reasons which will be subsequently explained herein.

The document handler 10 feeds documents to be imaged at a constant velocity with the CVT system past a scanning or slit image station 16 which is at the slit scanning platen portion 12b, as shown. For this document handler 10 document imaging, the RIS 14 is "parked" at this imaging station 16. Desirably, this movement of the RIS into the imaging station 16 position is merely a slight extension of the normal scanning travel of the RIS back and forth under the full size scanning platen portion 12a. That is, the RIS 14 is simply moved slightly further in the same plane beyond the end of the manual document placement position on platen portion 12a at one end thereof. Thus, the same RIS 14 movement drive and track or rails may be utilized at little or no increase in cost.

Documents 18 may be loaded face up in normal order in the document input tray 20 of the document handler 10 when automatic document input is desired. The stack of documents is then sequentially fed from the input tray 20 through a short, highly compact, "U" shaped document path 24 for imaging at the imaging station 16, and then after one imaging the simplex documents are fed directly on to a document output tray 22 in which the documents are restacked face down. However, as will be described, there is a partial difference in the document paths provided for simplex documents as compared to duplex documents. This is illustrated here by solid arrows representing the simplex document path 25 and dashed line arrows representing the duplex path 26. Note, however, that both simplex and duplex documents are ejected and restacked in the same document output tray 22 here, in the same manner, after their copying is completed.

The document input tray 20 here is closely superimposed above the document output tray 22. That is, these two trays closely overly one another to form a relatively enclosed space between the two trays. Yet, both trays are readily operator accessible. This space between the two trays 20 and 22 provides a protective and space saving inverter chute for duplex documents which are being inverted between the copying of their first and second sides.

Note that the U-shaped document path 24 contains a single natural inversion for turning each document sheet over once between its infeeding from input tray 20 and the imaging station 16. This is the only inversion in this document path 24. And there is no inversion in the duplex path 27 added portions. The document path 24 is like a "U" lying on its side, facing and connecting with the input tray 20 and output tray 22 at the upper and lower ends of the "U", and with the imaging station 16 on the bottom side of the "U" It may also be seen that the duplex document path 27 utilizes the same U-shaped document path 24 shared by both simplex and duplex documents, but additionally provides a short duplex documents return path from the output end of the U-shaped document path 24 back to the input of that path 24, as will be further described.

All of the document sheet feeding in the document path 24, including the duplex document path 27 portions, and the imaging station 16, are all provided in this example by only two drive motors, a first drive motor M1 and a second drive motor M2, respectively connected to the various document path sheet feeders as illustrated by the illustrated connecting dashed lines. Both of the drive motors M1 and M2, solenoid 72, and a solenoid 28 (for selectively lifting the nudger roll of the input feeder), and the clutches, are controlled by a controller 100, which may be of the type known in the prior art previously noted above. Also connecting with the controller 100 in a conventional manner are sheet path sensors for detecting the lead and/or trail edge of document sheets being fed through the document path 24, 27 such as the illustrated sensors 31, 32, 33, and 34. Thus, these sheet path sensors provide signals to the controller as to the present document position, when the respective sensor is activated, and because the document sheet is moving at a known speed, its position can be predicted in advance by simple timing in the controller in a known manner.

The solenoid 28 is connected to that portion of a top sheet separator/feeder 30 which sequentially feeds the top sheet of the stack of documents loaded in the input tray 20 into the U shaped document path 24, and separates each fed sheet from the respective underlying sheets. The sheet separator/feeder 30 may be driven by the motor M1, as shown. For electronic imaging, since the documents need not be recirculated, positive separation is particularly important to prevent multifeeds, which would result in missed document images which are not immediately detectable, especially if the copies are being printed remotely. Accordingly there is preferably provided in this separator feeder 30 a nudger roll which is cyclicly lowered by solenoid 28 onto the top of the stack for feeding or advancing the top sheet or sheets 18 into a positive retard separating nip. Here, the retard nip comprises a driven first feed roll 37 and an undriven retard roll 38. The driven feed roll 37 rotates to feed the top-most sheet at that point in time downstream into the document path 24, while subsequent or underlying sheets are retarded by the frictional retard roll 38 forming a nip therewith. To prevent wear spots or the like on the retard roll 38, the roller 38 is allowed some limited rotational movement forward or downstream. However, this roller 38 downstream rotation is resisted by a connected return spring 39, which spring 39 is wound up by roller 38 downstream rotation due to the high friction between rollers 37 and 38 when they are directly engaged (with no sheets therebetween). Whenever two or more sheets are in the retard nip between the rolls 37 and 38, the wound-up return spring 39 force is strong enough to overcome the (lesser) friction between the plural sheets in the nip, to push back upstream the underlying sheets, providing improved separation as further explained in the above-cited references. Once the top sheet has been fully acquired and fed downstream past the sensor 31, the nudger 36 may be lifted to prevent inadvertent further feeding therewith of an underlying sheet, and prevent smearing of document images of smearable ink or unfused toner. By using solenoid 28 lifting of the nudger roll 36 promptly after sheet acquisition is sensed at the sheet input sensor 31 adjacent the input tray 20, rather than camming the nudger roll, variable (optimized) timing may be provided for minimal nudger roll engagement and hence minimal potential smearing. The initial sheet input velocity is preferably faster than the normal CVT velocity in the main portion of the document path. That higher initial velocity enables the lead edge of the (next) document being inputted to catch up ,with (close or minimize the interdocument pitch or gap with) the trail edge of the previous document in the document path.

Once a top sheet has been separated and fed into the document path 24 as described above, it then enters the regular document path sheet drive system 40. This will be described here with reference to the driven rollers, although the mating and nip-defining idler rollers are also illustrated. As shown, these document path sheet drive rollers of this example comprise, in order: second or take-away rolls 42, registration rollers 44 downstream thereof, (optionally with an intermediate sheet deskew buckle chamber therebetween), then first CVT rolls 46, then an imaging station 16 with the overlying sheet holddown CVT roller 47, then third CVT rolls 48, and then (after passing a pivotal gate 49) reversible exit nip rolls 50 at the entrance to the output tray 22. Note that the latter sheet path drive rollers (46, 47, 48, and 50) are illustrated as all driven by the motor M2, which is preferably a servo-motor for controlled driving of these rolls and particularly to provide the accurate constant velocity desired for imaging for the CVT rolls 46, 47 and 48.

While the document sheet is being driven forward by the CVT drive system of M2 driving lower rolls 46, 47 and 48 forward, the output roller 50 in that same path is desirably also driven forward by M2 at the same speed. However, when a duplex document is to be reversed, this may preferably be done by clutch disconnecting the roller 50 shaft from M2, and then a simple reverse gear drive of the roller 50 shaft is electrically clutched in at that point to motor M1, while M1 continues to drive forward (downstream) the upper rollers 42 and 44 towards which the reversed document is fed by M1 reverse driven roller 50. To express it another way, for reversing, the clutch between roller 50 and M2 is disengaged and the clutch from M1 to the reverse gear drive for roller 50 is engaged. (Alternatively, a separate motor may be provided, if desired.) Note that for long duplex documents, this allows the trail end of the long duplex document to still be reverse fed out of roller 50 while the front end of that long document is already at the same time being fed forward through the CVT system for imaging by rollers 46, 47 and 48 driven forward by M2.

The illustrated imaging station CVT roller 47 may be gravity or spring loaded against the platen, and may also provide, or be associated with, an imaging background surface for appropriate image background for the document being imaged at that point. It provides the control of the document being imaged to maintain all of document within the depth of field and focus of the imaging system as the document passes through the imaging station, i.e., to maintain a uniform restricted (very narrow height) maximum spacing gap above the imaging plane at the platen upper surface, of, e.g., less than 0.5 mm. Some additional or alternative features are discussed below.

Center registration and feeding of all documents can be conventionally provided by a well-known dual rack and pinion connection of the side-guides of the document input tray 20, so that the side guides automatically move together to always center the document stack irrespective of the size of the loaded documents.

Turning now to another optional feature, for selectably enlarging certain original documents into enlarged copies on larger copy sheets, and/or enlarged partial images, without losing image resolution, it may be desirable to scan the document more finely by moving the document more slowly relative to the RIS 14. Thus, switching to a slower CVT document drive velocity may be optionally provided, e.g., one-half speed. Depending on the selected enlargement and copy sheet size, or for other purposes, it may be desirable to know in advance of that speed change the dimension(s) of the original document, especially in the CVT feeding and scanning direction. That is, to know the document size before the lead edge of that document reaches the imaging station 16. If the scanning speed of the CVT is to be changed, it needs to be done before the lead edge of the document enters the imaging station. However, the document handler 10 desirably has a very short document path length, such that the trail edge of a large document will not have cleared the document input sensor 31 before the lead edge of that same large document enters the imaging station 16, or, more importantly, the lead edge detector 33 just upstream of the imaging station 16. Variable speed CVT electronic image scanning and magnification or reduction is taught, for example, in Xerox Corp. U.S. Pat. No. 5,221,976 issued Jun. 22, 1993. Also, running facsimile CVTs at slightly different speeds to fit A4 size scanned originals into U.S. letter size copy sheets is known.

Accordingly, a document size detection system and algorithm can be provided as follows: A normal (smaller size) document trail edge can actuate the sensor 31 adjacent the document input tray 20 before the (present and known) path velocity of the document handler will cause the lead edge of that document to actuate sensor 33 before it reaches the imaging station. Thus, in this case of smaller documents, the input sensor 31 adjacent the input tray also provides a document dimension signal which may be used in connection with printing controller information on the degree of desired image enlargement and/or selected and/or automatically selectable available copy sheet size to decide whether or not to change the CVT velocity, and/or by what extent.

If, however, the document dimension in the document feeding direction exceeds the document path distance (and thus feed time) from the document input sensor 31 to the imaging station input sensor 33, then another document dimension estimating or measuring system may be needed before then if a CVT velocity change is to be provided based in part on the document size.

One such system is to measure (sense) the document input tray side guide settings, and to use that measurement to estimate the other (orthogonal) dimension of the documents in a known manner from a look-up table stored in memory of standard sizes of sheets. Noted are Xerox Corporation U.S. Pat. Nos. 4,579,444, 4,745,438 (e.g. Col. 11), 3,689,143, and 4,351,606; also U.S. Pat. Nos. 4,277,163 and 4,406,537 of others. (Also noted is Xerox Disclosure Journal Vol. 11, No. 2, p. 89, dated March/April 1986, by William A. Henry, II). The document scanner tray for the Eastman Kodak "1575" reportedly has a trail edge document length sensor and no back end guide wall. Similar stack edge (and end) guide position settings sensors are known for estimating the size of copy paper loaded into paper trays of a copier, such as U.S. Pat. No. 4,786,042.

The above system may also be generally used in other document handling systems for feeding documents from a stack of documents from a tray to an imaging station for imaging, where information as to the size of the document being fed to the imaging station is needed before the start of said imaging of said document, where said tray has an adjacent document edge sheet sensor, but the distance between said document input sensor and said imaging station is such that the end of a large document will not have cleared said sensor when the lead edge of that same document reaches said imaging station.

The gate 49 is located at the downstream end of the U-shaped document path 24, just upstream of the reversible exit nip rolls 50 and at the entrance of the duplex document path 27. The gate 49 does not obstruct documents coming from the imaging station 16, irrespective of whether they are duplex or simplex documents.

All documents here go directly past the imaging station 16 into the nip of the exit rolls 50. Simplex documents are fed on by these rolls 50 without any reversal thereof out into the exit tray 22 for restacking there in proper collated page order. These documents stack face down in 1 to N order, if the documents were fed face up in 1 to N order from the input tray 20 and were inverted once in the U-shaped document path 24.

However, for duplex documents which have been imaged on their first side and are yet to be imaged on their second side, as soon as the trail edge of the duplex document passes the sensor 34, the controller 100 directs the reversal of the exit rolls 50. The duplex document sheet at that point is extending substantially (for most of its length) out into the above-described inverter chute space between the trays 20 and 22. That duplex document sheet may now be rapidly reversed (25, 26) (feeding much faster than the CVT velocity) to be drawn back into the document handler toward the gate 49 by reversing rollers 50 at that point. The gate 49 is either solenoid or cam actuated or gravity loaded at this point into a position in which, as shown in phantom, the reversed duplex document is directed up into the duplex path 27. This duplex path 27 forms a return path of the duplex documents into the entrance of the U-shaped path 24, as previously noted.

The combined duplex documents path 24, 27 provides a complete loop, as may be seen. This complete duplexing loop 24, 27 is quite small and compact. Desirably, it has dimensions only slightly larger than that of the longest document dimension to be fed therethrough. That is, this system is operative as long as the trail edge of the duplex document being inverted clears the sensor 34 before the lead edge of that same document sheet returns to the sensor 34 through the loop path 27, 24 after having its second side imaged at the imaging station 16. The duplex loop path length is preferably long enough for a U.S. standard 17 inch (approximately 43 cm.) duplex document to be fed short edge first. I.e., so that the head of the 17" or other longest document to be imaged doesn't hit the pre-exit sensor 34 until the tail of that long document clears that sensor 34.

This refeeding of duplex document sheets through the path 24 for second side imaging turns those document sheets over a second time. For proper collated output into the output tray 22, the duplex documents may be reinverted before restacking by being again fed back through the same path 27, 24 in the same manner, utilizing the same reversal of the exit rolls 50, but passing through without imaging, and then ejected (by not reversing the exit rolls 50). Thus, the duplex document is then ejected, properly oriented face down, into the output tray 22. Face down output for duplex documents is, of course, with the first or odd side page down, since this is a 1 to N system.

Referring to the duplex document scanning sequences available, the simplest sequencing algorithm is to process all documents in a simple 1 to N sequence, including "immediate duplex" sequencing of duplex originals. That is, side 2 of each duplex document may be scanned directly after side 1, followed by side 1 of the next fed document, etc.. [Thus, one does not have to have 2 sheets in a document path at once.] The duplex document scanning sequence here may thus be side 1 of 1, skip, side 2 of 1, skip, side 1 of 2, skip, etc., relative to a normal inter-document gap for simplex documents feeding in this example of approximately 30 mm. Each "skip" is for inverting the document by reversal of the exit rolls to feed that sheet back through the clockwise CVT path loop again; first for imaging its second side, and then for a non-imaging pass of the document sheet for re-inverting it again for proper output stacking. There is no need for deskew, constant velocity, or slowing down for CVT scan in this nonimaging pass. Thus, this third, non-imaging, document loop pass is desirably at a substantially higher (slew rate) velocity, to save time and increase overall duplex productivity. However, the short path, simple drives and close document spacing may not allow that. As noted, after the duplex sheet is fed through the document path for the third time, it returns back to the reversible exit rolls for the last time and is ejected to stack in collated order. However, it will be appreciated that there are other document sequencing alternatives.

One such alternative is to use a known type of inverter with a tri-roll or open nip which allows two sheets to be in the inverter nip(s) at the same time, overlapping or shingling, i.e., respectively going in and out of the inverter chute within overlapping time periods. That can provide duplex document scanning page sequences with less skips, and higher productivity, such as; 1, 3, 2, 4, skip, skip, 5, 7, 6, 8, skip, skip, etc. However, an additional motor and rollers or a mechanism to open the nip would also be required. Also, opening and closing nips during CVT scanning may not be desirable for motion quality, timing, and/or other reasons. As may be seen, this alternative is not a directly sequential "immediate duplex" imaging algorithm, and thus electronic page buffering and page reordering is required.

Turning now to a separate disclosed feature which provides improved reliability; as described above, the platen 12 here is preferably in two separate portions, 12a and 12b. There is also provided here a platen gap 54 by a beveled platen edge 56 on the main or full size platen portion 12a end facing 12b, as shown. As described in more detail in the above allowed second cross-referenced application, this provides a space or groove extending below the upper surface of the platen portion 12b into which a baffle lip or catch 52 may be desirably placed or attached. That is, the baffle lip 52 extends above and below the upper surface of the platen portion 12b over which documents are being fed for imaging at the imaging station 16. This baffle lip 52 is closely adjacent but downstream of the imaging station 16. Thus, the lead edge of all documents fed through the imaging station 16 over the platen 12b upper surface are positively caught and deflected upwardly into the next feed nip (which is the nip 48 here).

The exemplary RIS 14 here may be, e.g., a diode type full width array of a conventional type for high resolution, scanning closely under the platen. It may use the well known integral fiber optic "selfoc" lenses. As noted, here the same RIS 14 may be "parked" for CVT input at an imaging station 16 which may be at one end of a single linear scan track which is only a slight extension of the same scan path used for the main platen 12a scanning system, thus saving space and minimizing components.

While a known system of temporarily stalled document lead edge registration rolls 44 (temporarily stopped nip sheet deskew system) may be used, it will be appreciated that a conventional moving (removable) gate system may be used instead, with the gate positioned just ahead of that nip, as shown. The lead edge of the sheet may be fed up to and held against the gate fingers while they are in the sheet path, until the sheet is slightly buckled, and until the time for the sheet to be fed. Then the gate fingers may be lifted, e.g., by a solenoid or cam. In such deskew system, the motor M2 may be used to continuously drive what is otherwise the stalled rolls 44 nip. Motor M1 would then only drive the sheet feeder 30 and the take-away nip 42.

The sheet path gate or diverter 49 adjacent the reversible exit rolls 50 for duplex documents being reversed may be a conventionally solenoid pivoted gate. However, alternatively this may be a one-way gravity gate, or a similarly functioning thin mylar spring flap gate, known per se in document handling, e.g. Xerox Corp. U.S. Pat. No. 4,884, 794, ref. 68, Col. 12, and Canon U.S. Pat. No. 4,627,709, Col. 6.

Another alternative would be to provide at 49 a known 2-sided gate, or an additional diverter gate, so that direct document recirculation directly into path 27, bypassing rollers 50 (i.e., without any inverter usage), could alternatively be provided. This could be used, for example, to allow and provide for a document "prescan" before re-imaging the same side, or an automatic reimaging pass in the event of an electronically detected defective first scan pass. Or, for example, to allow corrective image editing before a second pass of an image displayed on a screen after a first imaging pass. For example, if software is not provided to automatically recognize and electronically fill in or white-out the punch holes in documents with 3-ring or other holes in a first pass, which holes can undesirably image as large black dot areas on the copies if they are imaged against an optically black background.

It will be noted that the document path here does not need to have any active document side registration (transverse the feed direction), even before second side imaging, because any lateral misregistration may be digitally corrected. That is a known technique, e.g., simply by detecting the side edges of the document and counting the pixels of the full width scanner 14 array outside the document sheet edge area. Document edge detection can be enhanced by use of a spectral (mirror), superwhite, black, colored or other non-white image scanning background, e.g., on the surface of roller 47, and/or an associated baffle, at least in those areas in which document edges are being detected.

While the embodiment disclosed herein is preferred, it will be appreciated from this teaching that various alternatives, modifications, variations or improvements therein may be made by those skilled in the art, which are intended to be encompassed by the following claims:

What is claimed is:

1. In a document handler for sequentially feeding document sheets over an imaging platen to be imaged at a constant velocity with a constant velocity drive motor driving a document sheet feeding roller overlying said imaging platen for feeding engagement of document sheets between said constant velocity driven document sheet feeding roller and said platen when a forward driving signal is applied to said constant velocity drive motor, said document handler providing a document sheet feeding path from a document input to said imaging platen and to a document output, the improvement comprising:

a document feeding control system which predicts when said constant velocity driven sheet feeding roller will be driven against said imaging platen with no document sheet therebetween; and an automatic lifting system which automatically lifts said constant velocity document sheet feeding roller away from said imaging platen in response to said document feeding control system predicting that no document sheet will be between said constant velocity driven sheet feeding roller and said platen and said forward driving signal is being applied to said constant velocity drive motor;

wherein said constant velocity document sheet feeding roller has at least four sections of two different diameters, comprising an inner pair of common diameter feed roller surfaces, and an outer pair of slightly smaller diameter surfaces on opposite axial sides of said inner pair of feed roller surfaces which are not feeding roller surfaces.

2. The document handler of claim 1, wherein said outer pair of slightly smaller diameter surfaces provide document hold down and document edge detection image background.

3. The document handler of claim 1, wherein a reverse driving signal is applied to said constant velocity drive motor for duplex document sheets, and wherein said automatic lifting system is actuated in response to said reverse driving signal.

4. In a document handler for sequentially feeding document sheets over an imaging platen to be imaged at a constant velocity with a constant velocity drive motor driving a document sheet feeding roller overlying said imaging platen for feeding engagement of document sheets between said constant velocity driven document sheet feeding roller and said platen when a forward driving signal is applied to said constant velocity drive motor, said document handler providing a document sheet feeding path from a document input to said imaging platen and to a document output, the improvement comprising:

a document feeding control system which predicts when said constant velocity driven sheet feeding roller will be driven against said imaging platent with no document sheet therebetween; and an automatic lifting system which automatically lifts said constant velocity document sheet feeding roller away from said imaging platen in response to said document feeding control system predicting that no document sheet will be between said constant velocity driven sheet feeding roller and said platen and said forward driving signal is being applied to said constant velocity drive motor;

wherein a reverse driving signal is applied to said constant velocity drive motor for duplex document sheets, and wherein said automatic lifting system is also actuated in response to said reverse driving signal.

5. In a document handler for sequentially feeding document sheets over an imaging platen to be imaged at a constant velocity with a constant velocity drive motor driving a document sheet feeding roller overlying said imaging platen for feeding engagement of document sheets between said constant velocity driven document sheet feeding roller and said platen when a forward driving signal is applied to said constant velocity drive motor, said document handler providing a document sheet feeding path from a document platen and to a document output, the improvement comprising:

a document feeding control system which predicts when said constant velocity driven sheet feeding roller will be driven against said imaging platen with no document sheet therebetween; and an automatic lifting system which automatically lifts said constant velocity document sheet feeding roller away from said imaging platen in response to said document feeding control system predicting that no document sheet will be between said constant velocity driven sheet feeding roller and said platen and said forward driving signal is being applied to said constant velocity drive motor;

wherein said automatic lifting system comprises plural open jaws positioned to liftably engage reduced diameter jaw engaging areas of said constant velocity document sheet feeding roller.

6. The document handler of claim 5, wherein said open jaws have an outside dimension which is less than the maximum diameter of said constant velocity document sheet feeding roller so as to partially surround said roller without interfering with said feeding and without engaging said platen.

7. In a document handler for sequentially feeding document sheets over an imaging platen to be imaged at a constant velocity with a constant velocity drive motor driving a document sheet feeding roller overlying said imaging platen for feeding engagement of document sheets between said constant velocity driven document sheet feeding roller and said platen when a forward driving signal is applied to said constant velocity drive motor, said document handler providing a document sheet feeding path from a document input to said imaging platen and to a document output, the improvement comprising:

a document feeding control system which predicts predicts when said constant velocity driven sheet feeding roller will be driven against said imaging platen with no document sheet therebetween; and an automatic lifting system which automatically lifts said constant velocity document sheet feeding roller away from said imaging platen in response to said document feeding control system predicting that no document sheet will be between said constant velocity driven sheet feeding roller and said platen and said forward driving signal is being applied to said constant velocity drive motor;

The document handler of claim 1, wherein said constant velocity document sheet feeding roller has wing shaped baffle members mounted to its outer ends providing document hold down surfaces.

* * * * *